US012309289B2

(12) United States Patent
Minsky et al.

(10) Patent No.: US 12,309,289 B2
(45) Date of Patent: *May 20, 2025

(54) SCALABLE, SECURE, AND BROAD-SPECTRUM MECHANISM FOR ENFORCEMENT OF PROTOCOLS OVER MULTI-AGENT SYSTEMS

(71) Applicant: Rutgers, The State University of New Jersey, New Brunswick, NJ (US)

(72) Inventors: Naftaly H. Minsky, New York, NY (US); Chen Cong, Santa Clara, CA (US); David M. Zimmerman, South Orange, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/737,353

(22) Filed: Jun. 7, 2024

(65) Prior Publication Data

US 2024/0333522 A1   Oct. 3, 2024

Related U.S. Application Data

(63) Continuation of application No. 17/291,241, filed as application No. PCT/US2019/058277 on Oct. 28, 2019, now Pat. No. 12,041,178.

(Continued)

(51) Int. Cl.
*H04L 9/32* (2006.01)
*H04L 9/06* (2006.01)
*H04L 9/00* (2022.01)

(52) U.S. Cl.
CPC .......... *H04L 9/3247* (2013.01); *H04L 9/0643* (2013.01); *H04L 9/3236* (2013.01); *H04L 9/50* (2022.05); *H04L 2209/56* (2013.01)

(58) Field of Classification Search
CPC ... H04L 9/3247; H04L 9/0643; H04L 9/3236; H04L 9/50; H04L 2209/56; G06Q 10/00
See application file for complete search history.

(56) References Cited

U.S. PATENT DOCUMENTS

| 11,663,609 | B2* | 5/2023 | Christidis | ............. | H04L 9/3239 |
| | | | | | 705/317 |
| 12,041,178 | B2* | 7/2024 | Minsky | ................. | H04L 9/0643 |

(Continued)

FOREIGN PATENT DOCUMENTS

WO   2020/101869 A1   5/2020

OTHER PUBLICATIONS

Ao, X., et al., "Flexible regulation of distributed coalitions", Computer Security—ESORICS 2003, pp. 39 60. Springer, 2003.

(Continued)

*Primary Examiner* — Baotran N To
(74) *Attorney, Agent, or Firm* — Hamilton, Brook, Smith & Reynolds, P.C.

(57) ABSTRACT

Systems and methods for enforcing contract/protocol/law execution have a wide range of applicability. Embodiments have very low latency between a transaction and its validation and have strong scalability. An embodiment is a system for enforcing execution of a protocol among a plurality of parties. The example system includes (i) a controller provider configured to manage a plurality of automated controllers, (ii) a ledger, and (iii) an inspector. The controllers correspond to the plurality of parties. Each controller is configured to enforce execution of the protocol using a computer program integrated with the controller. The controller provider intercepts messages sent or received by the controllers and stores them in the ledger, representing history of events or operations between the parties, and the treatment of those events or operations by the controllers. The inspector accesses the ledger and evaluates whether (Continued)

representations of events or operations stored therein comply with the protocol.

20 Claims, 7 Drawing Sheets

Related U.S. Application Data

(60) Provisional application No. 62/768,190, filed on Nov. 16, 2018.

(56) References Cited

U.S. PATENT DOCUMENTS

| | | |
|---|---|---|
| 2017/0039330 A1 | 2/2017 | Tanner et al. |
| 2018/0089638 A1 | 3/2018 | Christidis et al. |
| 2018/0096360 A1* | 4/2018 | Christidis ............. H04L 9/0643 |
| 2018/0113752 A1 | 4/2018 | Derbakova et al. |
| 2021/0391998 A1 | 12/2021 | Minsky et al. |

OTHER PUBLICATIONS

Blakstad S., et al., "FinTech Revolution: Universal Inclusion in the New Financial Ecosystem", Springer, Jun. 27, 2018.

Castro, M., et al."Proactive recovery in a byzantine-fault-tolerant system", In osdi00, Oct. 2000.

Chen, Q., "In the World of Cryptocurrency buzz, blockchain is the real winner", Jan. 11, 2018. https://www.cnbc.com/2018/01/10/in-the-world-of-cryptocurrency-buzz-blockchain-is-the-real-winner.html.

International Preliminary Report on Patentability for PCT/US2019/058277 dated May 27, 2021 titled "Scalable, Secure, And Broad-Spectrum Mechanism For Enforcement Of Protocols Over Multi-Agent Systems".

International Search Report and Written Opinion received for PCT Patent Application No. PCT/US2019/058277, mailed on Jan. 17, 2020, 9 pages.

Ionescu, M., et al., "Enforcement of communal policies for peer-to-peer systems", Proc. of the Sixth International Conference on Coordination Models and Languages, Pisa Italy, Dec. 2003.

Kasireddy, P., "Blockchains don't scale. Nol today, at least. But there's hope". Aug. 22, 2017 https://hackernoon.com/blockchains-dont-scale-not-today-at-least-but-there-s-hope-2cb43946551a.

Merkel. D, "Docker: Lightweight linux containers for consistent development and deployment", Linux Journal, (239):2, 2014.

Minksy, N.H., et al., "About LGI*", Rutgers University, Apr. 15, 2018. LGI (Law Governed Interactions—http://www.moses.rutgers.edu/documentation/manual.pdf).

Minsky, N.H. "Law Governed Interaction {LGI): A Distributed Coordination and Control Mechanism {An Introduction, and a Reference Manual)", Rutgers, Feb. 2006. (available at http://www.moses.rutgers.edu/).

Minsky, N.H., "On the dependability of highly heterogeneous and open distributed systems", Journal of Software Engineering and Applications, 11, 28-68, 2018.

Minsky, N.H., et al., "Law-governed interaction: a coordination and control mechanism for heterogeneous distributed systems", TOSEM, ACM Transactions on Software Engineering and Methodology, 27 pages, Jul. 2000.

Pearson, J., "WTF Is the Lighting Network and Will ii Save Bilcoin?", Jan. 23, 2018. The Bitcoin Lightning Network—https://motherboard.vice.com/en_us/article/gyw9aq/wll-is-the-lightning-network-and-will-it-save-bitcoin.

Peters, G.W., et al., "Understanding modem banking ledgers through blockchain technologies: Future of transaction processing and smart contracts on the internet of money," Banking Beyond Banks and Money, 33 pages, Nov. 2015.

Poon, J. et al., "The Bilcoin Lighting Network: Scalable Off-Chain Instant Payments", 2016.https://lightning.network/ lightning-network-paper.pdf.

Poon, J., et al. "Plasma: Scalable Autonomous Smart Contracts", Aug. 11, 2017. https://plasma.io/plasma.pdf.

ReportBuyer, "The global blockchain market size is expected to grow to USD 7,683.7 million by 2022", PRNewswire, Dec. 26, 2017. https://www.pmewswire.com/news-releases/the-global-blockchain-market-size-is-expected-to-grow-to-usd-76837-million-by-2022-300575324.html.

Smart Contracts Markel Report—Forecast 2027 MFRF—https://www.marketresearchfuture.com/reports/smart-contracts-market-4588)retrieved from Internet May 12, 2021.

Szabo, N., "Formalizing and securing relationships on public networks", First Monday, 2(9), 1997.

Vukolic, M., "Rethinking permissioned blockchains", Proceedings of the ACM Workshop on Blockchain, Cryptocurrencies and Contracts, pp. 3-7, 2017.

* cited by examiner

SCALABLE, SECURE, AND BROAD-SPECTRUM MECHANISM FOR ENFORCEMENT OF PROTOCOLS OVER MULTI-AGENT SYSTEMS

RELATED APPLICATIONS

This application is a continuation of U.S. application Ser. No. 17/291,241, filed May 4, 2021, which is a National Stage Entry U.S. International Application No. PCT/US2019/058277, filed Oct. 28, 2019, which designates the U.S., published in English, and which and claims the benefit of U.S. Provisional Application No. 62/768,190, filed on Nov. 16, 2018. The entire teachings of the above application(s) are incorporated herein by reference.

BACKGROUND

There is a growing realization in the commercial world that a contract, or another type of protocol, intended to govern transactions among members of a multi-agent system (MAS) operating electronically over the Internet, needs to be enforced electronically. And there is much interest in implementing such enforcement securely using a mechanism called a "smart contract," which is based on blockchain technology. However, the smart contract mechanism suffers from serious performance shortcomings, resulting in a drastic limitation of its effective domain of applications.

In particular, smart contracts are unscalable with respect to the frequency of transactions of a multi-agent system. Moreover, smart contracts cannot handle time-critical systems where the latency between a transaction and its verification must be, for example, less than a second. These shortcomings are due to two underlying properties of smart contracts: (a) the need to arrive at a consensus whenever a small block of transactions is to be added to the blockchain, and (b) the virtually sequential verification of transactions, in that a block cannot be admitted to the blockchain before the preceding block was verified and admitted. Moreover, smart contracts have great difficulties of enabling interoperability between contracts operating on different blockchains. These difficulties are inherent in the use of blockchain by smart contracts. Consequently, smart contracts cannot be used effectively for very large financial applications, particularly for those involving business-to-business commerce; and for systems-of-systems in general.

SUMMARY

Disclosed herein are systems and methods for enforcing contract/protocol/law execution having a wide range of applicability. The terms contract, protocol, and law may be used interchangeable herein. The disclosed systems and methods have very low latency between a transaction and its validation, and have strong scalability.

One example embodiment is a system for enforcing execution of a protocol among a plurality of parties. The example system includes a controller provider configured to manage a plurality of automated controllers. The example system also includes a ledger and an inspector. The plurality of automated controllers correspond to the plurality of parties. Each automated controller is configured to enforce execution of the protocol using a computer program integrated with the automated controller. The ledger is configured to be accessible by the controller provider and store representations of events or operations handled by the automated controllers. The inspector is configured to access the ledger and evaluate whether representations of events or operations stored in the ledger are in accordance with the protocol.

Another example embodiment is a method of enforcing execution of a protocol among a plurality of parties. The example method includes accessing, via a controller provider, a plurality of automated controllers corresponding to the plurality of parties and integrating the protocol with the automated controllers as a computer program executable by the automated controllers to enforce execution of the protocol. The method further includes storing, in a ledger, representations of events or operations handled by the automated controllers and inspecting a given representation of a given event or operation handled by a given automated controller to determine whether the given event or operation stored in the ledger is in accordance with the protocol.

The controller provider can implement the automated controllers as Linux containers (or virtual machines). The controller provider can provide to the ledger time-ordered representations of events or operations handled by the automated controllers.

The ledger can be implemented as a blockchain.

The inspector can create model controllers corresponding to the automated controllers to track a state of each of the automated controllers. Such a model controller can include a data structure that represents a current state of a corresponding automated controller. The inspector can use the state of a given model controller to predict a proper response of a corresponding automated controller to a next event to occur at the corresponding automated controller. In such embodiments, the inspector can determine that the automated controller corresponding to the given model controller has malfunctioned if an entry added to the ledger by the corresponding automated controller does not match the response predicted by the inspector. In such a case, the inspector can cause the malfunctioned automated controller to be reconstructed and its operation resumed with the last state before its malfunction, and can report the malfunctioned automated controller and at least one operation it carried out before its reconstruction.

A given community of parties operating subject to a given protocol can be served by at least one ledger and at least one inspector. The disclosed systems and methods can support far more complex systems than a set of isolated communities operating under different protocols/laws. In particular, the disclosed systems and methods can govern complex systems, such as federated enterprises, that comprise of a collection of communities operating subject to a hierarchically organized ensemble of protocols/laws, and which may allow different communities to interoperate in a regulated manner.

In some embodiments, the system can include a plurality of ledgers, inspectors, or controller providers. In the case of a plurality of inspectors, each inspector can be configured to evaluate representations of events or operations associated with a subset of the automated controllers.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
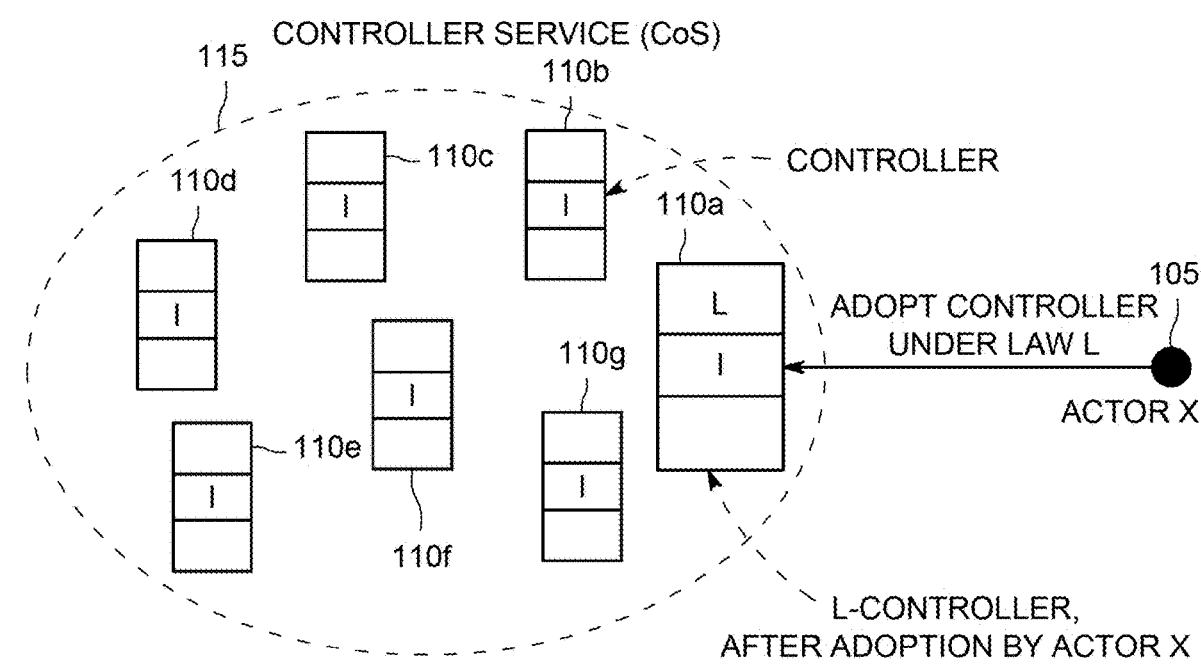
FIG. 1 is a block diagram illustrating an example adoption of a generic controller from a controller provider (CP).

A description of example embodiments follows.

Section 1—Introduction

There are many situations where a group of autonomous actors—which may include software processes, physical devices, and/or people operating via a platform like a smart phone—need to interact with each other over the Internet. Such an interaction often needs to comply with a given protocol. Such a protocol may represent a contract that binds these actors, or the protocol may be necessary for the actors to collaborate effectively on some common goal, or to compete safely with each other for the use of some resources.

The term "protocol" may also be referred to as a "contract" or as a "law." All three terms are used herein. "Protocol" is used as a general term, when not discussing any particular enforcement mechanism. The other two terms are used when discussing mechanisms that employ them. In particular, the term "law" is used when discussing the systems and methods disclosed herein.

It is sometimes possible to establish a given protocol P over a community of actors by relying on voluntary compliance with it by all members of the community, but the effectiveness of voluntary compliance is severely limited because it needs to satisfy the following two conditions to be reliable (cf. Reference [3]): (a) it must be in the vested interest of everybody in the community to comply with protocol P; and (b) a failure to comply with P by anybody in the community should not cause any serious harm to anybody else. If any one of these conditions is not satisfied, then the given protocol needs to be enforced. A mechanism used for enforcing such a protocol is called herein a protocol enforcement mechanism, or PEM. Section 1.1 below describes a set of desirable qualities of a PEM. Section 1.2 reviews two state-of-the-art PEMs, evaluating them in terms of these qualities, and finding them wanting.

Section 1.1—Desirable Qualities of a Protocol Enforcement Mechanism

Since there is a wide range of types of systems and systems-of-systems that may benefit from the enforcement of protocols, one would like to have a single protocol-enforcement mechanism (PEM) which is sufficiently broad-spectrum to all, or most, of them. Identified here are four qualities that a PEM should satisfy to be significantly broad-spectrum. They are:

(1) Trustworthiness, i.e., Dependability and Security: The degree to which a PEM can defend itself against failures (dependability) and attacks (security).
(2) Short Latency: Latency means the time it takes for a PEM to resolve a given transaction. Short means of the order of milliseconds or less.
(3) Scalability: Scalability means that the latency is virtually independent of the volume and frequency of transactions in a given system.
(4) Controllable Interoperability: Interoperability means the ability of communities that operate subject to different protocols to interact with each other; and there needs to be a way to control which communities can interoperate with each other and how.

These qualities are necessary for a PEM to be usable for a wide range of systems types for the following reasons:

First, trustworthiness is critical in many types of applications, such as financial and industrial ones, so it needs to be satisfied.

Second, time-critical applications require the latency to have an upper bound, which may be of the order of milliseconds or even less. Such upper bounds may be required, for example, in a collection of interacting physical machines operating in an industrial plant, or in a set of interacting components of an airborne control system. And a system involving humans may require latency of the order of seconds, even if it is not exactly time-critical.

Third, scalability is required for large systems, such as the financial system under construction described in Reference [11], where "a reasonable estimate of [its] peak figure may be in the region of several thousand transactions per second."

Fourth, interoperability is required when different systems, each operating under its own protocol, need to interact with each other. Moreover, complex systems, such as enterprise systems, cannot be governed by a single protocol. Rather, different groups of actors engaged in different types of activities would be required to operate subject to different protocols. Therefore, a PEM needs to support multi-community systems, where different communities, operating under different protocols, need to be able to interoperate; and there is to be a way for such interoperation between communities to be regulated.

Section 1.2—State-of-the-Art of Protocol Enforcement Mechanisms

The following describes two existing and very different realizations of the concept of PEM, finding both of them lacking in terms of the qualities described above.

Section 1.2.1—The Blockchain-Based Smart Contract Mechanism: This type of mechanism—which was inspired by a 1997 paper (Reference [9]) written by Nick Szabo—became very popular, mostly for financial and commercial applications (see Reference [8]). Its main characteristic is that the enforcement of contracts is carried out over a blockchain, which provides this mechanism with a high level of security.

But smart contracts do not provide the other qualities listed above. First, the latency cannot be shorter than the time to reach consensus—a fundamental element of blockchains. And this latency is quite substantial, which means that smart contracts cannot be used for many time-critical systems. Second, the smart contract mechanism is not scalable, as openly admitted by many researchers and developers of such systems (although some, like Reference [10], try to improve the level of scalability of smart contracts). Furthermore, blockchain-based smart contracts cannot handle really complex systems, such as federated enterprises, supply chain, and healthcare systems. Such systems are composed of many different communities operating under different interdependent protocols (or contracts) which often need to interoperate. Such systems cannot be handled without interoperability between blockchains, which has not been achieved in any general sense, and is widely viewed as the holy grail of this field.

Section 1.2.2—The Law-Governed Interaction (LGI) Mechanism: This mechanism, which is described in more detail in Section 2, below, satisfies many of the qualities specified in Section 1.1, above. This includes very short latency, high level of scalability, and very general concept of controllable interoperability. But LGI has a flaw (described in Section 3) which reduces its security level significantly.

The systems and methods disclosed herein can enforce a given law via LGI, but can also eliminate the above-mentioned flaw of LGI by using a mechanism that detects the failure of any controller to comply with the law under which it is supposed to operate, and to recover from this failure. This system or method is called Cop herein, because it can be thought of as being analogous to what cops do. Cop satisfies all the qualities introduced in Section 1.1, which are required for a PEM to be broad spectrum. A functionally complete prototype of Cop has been implemented, and its efficacy has been demonstrated and tested by fairly extensive experimentation.

Section 2, below, presents an outline of the LGI mechanism; Section 3 describes a security flaw of LGI; Section 4 introduces Cop, which eliminates the flaw of LGI, and Section 5 introduces some important aspects of Cop not described in Section 4.

Section 2—An Outline of LGI

The following is a brief outline of the LGI mechanism. For a deeper and more detailed description of LGI, two sources may be consulted: (a) an academic Journal paper, Reference [7]; and (b) a detailed manual of LGI (Reference [5]), which includes a set of tutorials.

Consider a distributed multi-agent system C whose members (referred to herein as "actors") interact with each other subject to a given law L (note that LGI uses the term law for what also may be called a protocol or a contract). Such a multi-agent system C can be called an L-community, as it is a collection of actors whose interaction with each other is governed by at least one common law L. The following description assumes that an L-community is isolated, that is, its law does not permit the members of the community to communicate with anybody not operating under law L. But LGI is not limited to isolated communities, as described in Section 2.3, below.

The enforcement of the law is strictly decentralized, as follows: Each member c of C interacts with other members of C via a private surrogate called a L-controller. The surrogate of c ensures that the interactive behavior of c complies with law L, and this surrogate does so locally, with no knowledge of or dependency on anything that happens simultaneously anywhere over the Internet. Note that the combination of an actor with its surrogate may together be referred to as an L-agent (or, simply an agent).

Thus, the enforcement of law L over the interactive activities of members of community C is done in a decentralized manner, and virtually in parallel, by the various L-controllers serving as surrogates of the members of C. This enforcement is very efficient and inherently scalable.

The L-controllers that serve as surrogates of the members of a L-community C can run on a generic controller designed to interpret and enforce any law written in the LGI's law language. Such controllers can be maintained by a controller server (CoS) (see Section 2.2, below). For an actor c to operate as a member of community C it needs to acquire a generic controller from the CoS, and load law L into it, thus forming its private L-controller, which acts as its surrogate by enforcing law L on its interactive activities.

FIG. 1 illustrates an example adoption of a generic controller from a Controller Service (CoS) 115. Actor x 105 adopts one 110a of a plurality of generic controllers 110a-g by integrating a particular law L with controller 110a. Controller 110a then may be referred to as a L-controller.

Section 2.1—The Concept of Law Under LGI

An LGI law L is formulated in terms of three elements, defined with respect to a given L-controller x:

1. A set E of regulated events (or, simply, events) that may occur at x. E includes, among others: (a) The adoption of this controller by an actor in community C—which is the first event that occurs at x. (b) The arrival of a message at x, and the sending of a message by x; note that a message may arrive at x from three sources: (i) from another controller; (ii) from the actor that adopted x; and (iii) as a result from some exception, which is reported to x via a message. And (c) an event called obligationDue, which is part of a proactive capability of LGI, this is described in Section 4.5.

2. The state Sx of controller x, which is distinct from the internal state of the actor that uses x as its surrogate—of which the law is oblivious. The state Sx can be a set of terms of an arbitrary size.

3. A set O of operations that can be mandated by a law to be carried out by the controller x upon the occurrence of a regulated event. The set O can include, among others: (a) replacing the state Sx of x with another state (i.e., changing the state Sx); and (b) sending some messages to anybody on the Internet.

For a more complete description of these elements, see Reference [5].

The role of a law is to decide what should be done in response to the occurrence of a regulated event at a controller operating under it. This decision, with respect to controller x, is formally defined by the following mapping:

$$E \times Sx \to (O)^* \times Sx \qquad \text{(Formula 1)}$$

Using a less formal notation: the law, when applied to a given controller x is a function $$\text{law: } (e, s) \to (m, ns) \qquad \text{(Formula 2)}$$

Formula 2 maps a given (e, s) pair, into a ruling (m, ns). Here, e is an event that occurred in controller x, and s is the state of x at the time of occurrence of this event. The ruling that x is to carry out includes: (a) a, possibly empty, list m of operations that x must execute (which are often messages to be sent); and (b) a new state ns that is to replace the current state of x.

These definitions make it clear that the law is strictly local. Indeed, the event that occurs at the controller and its state are local. And the ruling is to be carried out locally. Of course, if the ruling calls for some message to be sent to another controller, then this message would have a non-local effect. But the very sending of this message is local. In practice, the second component of the ruling is not the new state of the controller, but the delta, i.e., the change to be made to the current state, thus creating the new one. But it is somewhat easier to explain the mechanism described below when the ruling specifies the new state.

It should be noted that while Formula 1, above, is a definition of the semantics of laws, it does not specify a language for writing them. In fact, the current implementation of LGI supports several law languages, one of which is JavaScript. The choice of a law language has no effect on the semantics of LGI, as long as the chosen language is sufficiently powerful to specify all possible mappings defined by Formula 1.

The statefulness of controllers enables laws to be sensitive to the history of interactions between members of a community, which is, in turn, critical for establishing coordination protocols between them. Note the interplay between the fixed law and the dynamically changing state of a given controller x. On one hand, the ruling of the law may depend on the current state of x. On the other hand, the evolution of the state is regulated by the law—although it is driven by the various events that occur at x, many of them coming from other controllers in a given community. Regarding the enforcement of laws, a controller x deals with events occurring at it sequentially, and if several events occur at x at the same time, they will be handled in an arbitrary order. The ruling of an event e is carried out atomically, before handling any other event.

Figure 2:
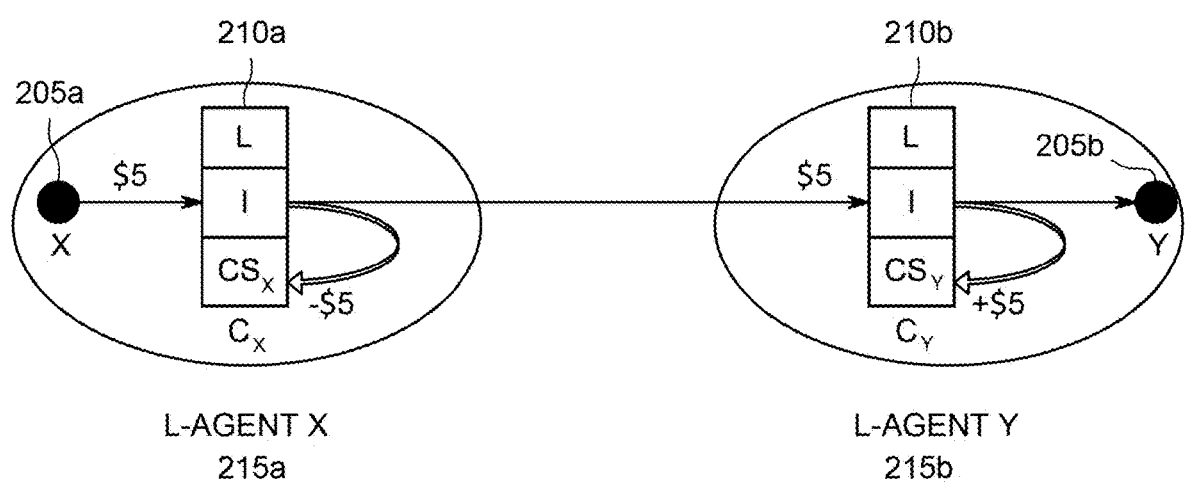
FIG. 2 is a block diagram illustrating an example interaction between two agents representing actors.

FIG. 2 illustrates an example interaction between two agents, x 215a and y 215b. Agents 215a and 215b are depicted by dashed ovals that include actors a 205a and y 205b (solid circles) and corresponding controllers 210a and 210b that operate under law L, which serves as a surrogate for interacting with other agents. The controller generally resides away from its actor and is not subject to the actor's control. The dual nature of control is exhibited here: the transfer of a message is first mediated by the sender's controller, and then by the controller of the receiver—both of which operate under the same law, but they are likely to have different states due to their different histories of interaction. FIG. 2 depicts an example manner in which agent x 215a sends $5 to an agent y 215b, subject to the law L—such as the Money Transfer (MT) law described below—under which both agents 215a and 215b operate.

Section 2.2—Trustworthy Controller Service (CoS)

LGI requires the availability of a set of authentic generic controllers that can be made to operate as L-controllers for any given law L. There are several ways for achieving such an infrastructure of LGI. One example is to create a controller service (CoS) that maintains a set of authentic controllers and leases the controllers to its customers, possibly for a fee. To be trustworthy, a CoS must be managed by a highly reputable organization, which can vouch for the authenticity of its controllers. Moreover, the CoS should provide each of its controllers with a digital certificate signed by the CoS itself. This certificate can be used by the controllers to authenticate themselves as genuine LGI controllers.

Section 2.3—Controllable Interoperability

So far, the case of an isolated L-community has been described, whose members interact with each other subject to a common law. But LGI is far more general than that, in the following senses, for example: First, LGI can handle any number of isolated communities, operating under different laws. Second, LGI can enable members of different such communities—each operating under its own law—to interoperate with each other in a regulated manner. This can be achieved by having the laws of each community specify the condition under which its members can interact with each other. Third, LGI enables the organization of a set of laws that collectively govern a single complex system into a coherent ensemble called a conformance hierarchy H. H is a tree of laws rooted by a law called LR, in which every law, except of LR itself, conforms transitively to its superior law. Moreover, the conformance relationship between laws in H is inherent in the manner in which H is constructed, requiring no extra validation. For a formal definition of such a hierarchy of laws see Reference [1], and for an example application of such a hierarchy see Reference [6].

Section 2.4—Two Examples of Laws

The following introduces two simple examples of LGI-laws, called "monitoring law" and "money transfer law." Each of these laws is described informally, and the second is also stated formally in one of the law languages currently supported by LGI.

Section 2.4.1—Monitoring Law (MO)

The following informally stated law, called MO, establishes a systematic monitoring scheme for all communications within a given community. This law can be specified by the following two rules:

Rule 1. When any new MO-agent is created—by an actor adopting a controller subject to law MO—the controller of the newborn agent sends a message to the designated monitor, essentially recording its own birth.

Rule 2. Whenever an MO-message is sent, a copy of it, along with the addresses of the sender and its target, is sent to the monitor.

Section 2.4.2—Money Transfer Law (MT)

This MT law provides an initial budget of $1000 to every MT-agent (this is done upon the adoption of a controller with law MT). Then, the law enables every MT-agent to transfer to every other such agent, any amount of money smaller than or equal to its current budget—while changing the budgets of the sender and of the receiver appropriately.

A formal statement of this law—written in the law language based on CoffeeScript (a dialect of JavaScript)—is provided below. This law has three rules, each of them contains comments (lines starting with #) that explains its effect.

Law MT:

```
LawScript:  CoffeeScript
# (R1) When the controller is adopted,
# initialize the agent's budget to 1000.
UPON "adopted", ->
    DO "set", key: "budget", value: 1000
    return true
# (R2) An agent can send
# any positive amount of money to another agent
# provided that the amount is not greater than its budget.
# Then the amount will be deducted from its budget.
UPON "sent", ->
    send_amount = parseInt(@message)
    new_budget = CS("budget") - send_amount
```

-continued

```
Law MT:

if send amount > 0 and new budget >= 0
   DO "set", key: "budget", value: new_budget
   DO "forward"
   return true
# (R3) When an agent receives a positive amount of money,
# the amount will be deposited to its budget.
UPON "arrived", ->
   received_amount = parseInt(@message)
   if received_amount > 0
      DO "set", key: "budget", value: CS("budget") + received_amount
   return true
```

Section 3—The Security Flaw of LGI

Even if the CoS does its utmost to maintain and protect authentic controllers, some controllers may malfunction by violating the law under which they operate—this may, for example, be the result of some bug in the code of the controller, a bug that manifest itself rarely in practice; or it may be due to a corruption of the controller by an attack on it. Such a malfunction can be referred to as a failure of a controller. Of primary concern are Byzantine failures, where a controller continues to operate, but in an unpredictable manner. (Fail-stop failures can be handled effectively by LGI.)

The security flaw of LGI is that it does not provide an effective way for discovering failing controllers, and does not provide a way for recovering the failing controller and for correcting the damage that it can cause. This can be a serious drawback because in some cases a Byzantine failure of even a single controller can be devastating to an entire community. A case in point is the Money Transfer (MT) described in Section 2.4.2. If one controller x has been corrupted, it can distribute perhaps an unlimited amount of fake money among other members of the MT-community, without raising any suspicion, at least for a while.

It is possible in some cases to discover, eventually, that some controller is corrupted and to identify it. This may require the imposition of a monitoring regime, like under law MO described in Section 2.4.1. For example, if one added such a monitoring regime to the Money Transfer law, one can discover, eventually, that something is wrong regarding the money in the community, and one may even be able to identify the culprit. But this could take a long time, time that can be used by the failed controller to inflict much damage on the system—damage that could be very difficult or impossible to reverse. Moreover, the discovery of failures by monitoring would have to be tailor-made for any given application, and it does not work for many applications. What is needed is a technique for an immediate recognition of a Byzantine failure of a controller operating under any law. This technique should enable the recovery of a failed controller, and the resumption of its operations with minimal loss. There is, of course, a general technique for handling Byzantine failures, see Reference [2] for example. But these techniques are far too slow and too expensive for handling a system with many controllers. A more efficient treatment of the possible Byzantine behavior of the controllers of LGI is provided by the LGI-based law enforcement mechanism called Cop, which is introduced below.

A more efficient treatment of the possible Byzantine behavior of the controllers of LGI is provided by what is referred to herein as a law enforcement mechanism, or Cop, which may be an LGI-based realization of the general concept of PEM described at the top of Section 1. Cop is introduced below.

Section 4—The Cop Mechanism

Cop carries out two complementary functions in enforcing a given law L over an L-community. One function is the enforcement, per se, of law L. This can be carried out by the existing LGI mechanism (with a variant described in Section 5.2). The other function has dual goals: (a) to detect any failures—if there are such—of L-controllers to enforce the law L correctly; and (b) to recover from the failure, right after the failure occurs, enabling the controller to resume its proper operation. This dual function is carried out by a new mechanism that can be called "detection and recovery," or D&R. These two aspects of Cop—LGI and D&R—operate in conjunction in enforcing a given law L over an L-community, rendering the enforcement virtually unerring, despite the possible misbehavior of any number of controllers. The process of enforcement per se via LGI does not require much further description, because it is described in Section 2. The D&R aspect of Cop is described below.

It should be noted that for simplicity most of the description of Cop herein involves isolated communities whose members interact only with each other subject to a common law, e.g., a single L-community C, whose members operate subject to law L. But as described in Section 5.1, Cop is not limited to dealing with singleton isolated communities. Like LGI itself, Cop can govern complex systems constituted from many interacting communities interoperating subject to a hierarchy of laws.

Section 4.1—The Gist of the Detection and Recovery (D&R) Mechanism

Broadly speaking, D&R operates by systematic inspection of the interactive behavior of all the L-controllers that serve a given L-community, attempting to achieve two complementary goals: (a) to detect the failure, of any of these controllers to comply with the law L under which it is supposed to operate; and (b) to recover from such a failure. But since the behavior of a given controller depends on its interaction with others, the detection of the failure of controllers may seem to require a global analysis of the interaction between all the controllers serving a given L-community. This is a daunting process, which would be very time consuming, and probably not feasible if more than one controller may be failing at the same time. Fortunately, as described below, no such global analysis is required due to the inherently local nature of LGIs laws.

Section 4.1.1—Locality: the Key to Effective Inspection

The key to effective inspection is the local nature of LGI laws, and the resulting ability to enforce a law locally on any given controller—with no knowledge of the state and behavior of any other controller. And because the enforcement is local, it follows that non-compliance with the law can also be dealt with locally, at each controller, separately from all others. Thus, the inspection of the behavior of all the L-controllers that serve a community can be done separately for each controller, without any knowledge or consideration of the other controllers, and of any other actor in the system. This simplifies the process of inspection enormously, and makes it very efficient. Moreover, the inspection can be made to be scalable by inspecting various sub-groups of controllers in parallel.

Section 4.2—The Structure of the D&R Mechanism

The D&R mechanism can inspect concurrently any number of communities, operating under different laws. And it deals with these communities independently of each other. Therefore, most of the description herein is about a single community. However, Section 5.1 describes the treatment of multiple communities, which may interoperate with each other.

The D&R mechanism can be composed of three components that operate in concert. The following is a broad description of these example components and of their functions. They are described in detail in the following subsections.

1. A ledger G(L) that maintains a time-ordered list of events that occur in the L-controllers of the L-community C, and a list of operations carried out by these controllers. This is necessary because the D&R may not be able to inspect the controllers themselves as it does not have access to them. So, the D&R inspects the interactive behavior of the controllers, which is being recorded on the ledger.

2. An inspector I(L), which performs the inspection of the L-controllers.

3. A controller provider (CP), which plays the following three roles: (i) The CP maintains the set of controllers used by Cop. (This is the role served by the CoS of the original LGI, but the LGI component of Cop uses the controllers provided by the CP.) (ii) The CP feeds the ledger G(L) the information it needs for the inspector I(L) to operate, for every law L that Cop handles. And (iii) the CP participates in the recovery of failed controllers.

Figure 3:
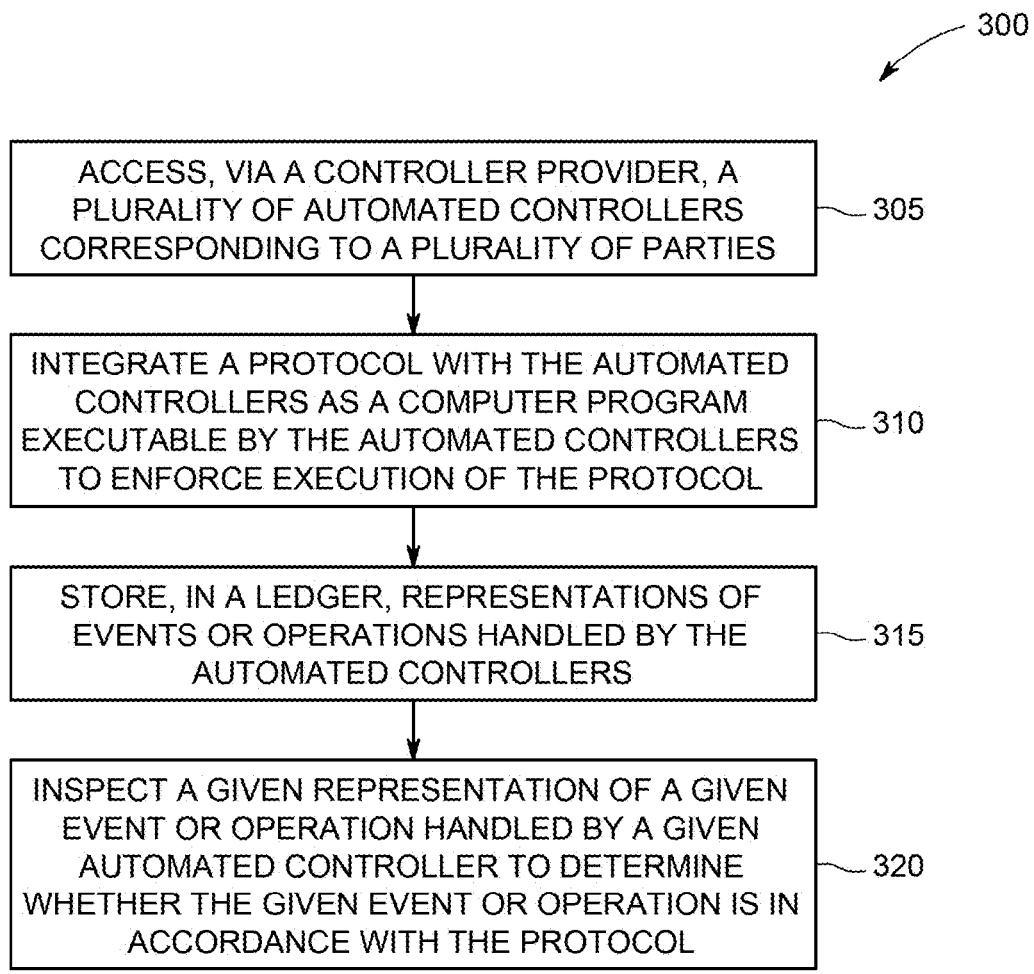
FIG. 3 is a flow diagram illustrating a method of enforcing execution of a law among a plurality of parties, according to an example embodiment.

FIG. 3 is a flow diagram illustrating a method 300 of enforcing execution of a law among a plurality of parties, according to an example embodiment. The example method 300 includes accessing 305, via a controller provider, a plurality of automated controllers corresponding to the plurality of parties and integrating 310 the protocol with the automated controllers as a computer program executable by the automated controllers to enforce execution of the protocol. The method 300 further includes storing 315, in a ledger, representations of events or operations handled by the automated controllers and inspecting 320 a given representation of a given event or operation handled by a given automated controller to determine whether the given event or operation stored in the ledger is in accordance with the protocol. Storing the representations of events or operations in the ledger can include intercepting a flow of messages into and out of the controllers and storing representations of the events or operations in the ledger in an appropriate time-order.

Now, consider another law L', and the L'-community governed by it. The D&R mechanism handles this community with a different ledger G(L'), and a different Inspector I(L'). But the same CP can handle both of these communities and any other community operating under Cop.

The following three subsections describe the three example components of D&R introduced above, starting with the CP. These components are described in conjunction with FIG. 4, which illustrates an example architecture 400 of Cop focusing on a L-community, according to an example embodiment. As shown, the L-community includes a plurality of members 410a-c created by corresponding actors 405a-c. The members 410a-c are created by the actors 405a-c by acquiring generic controllers u, v, and w from a CP 415 and by incorporating a law L with the controllers. Each member of the L-community is configured to enforce execution of the protocol using a computer program integrated with the controller.

Section 4.2.1—Controller Provider (CP)

As described above, CP 415 maintains a set of authentic controllers 410a-c, which is the function of the CoS of LGI (note that the LGI part of Cop would typically use a CP, not a CoS), and provides important contributions to the operation of the D&R mechanism.

A CP may serve any number of communities, each operating subject to its own law. Some of these communities may be isolated; others may interoperate with each other in a regulated manner. Also, there may be any number of disjoint CPs each handling its own communities, which cannot interoperate with the communities handled by other CPs.

Section 4.2.1.1—The Architecture of a CP

First, the controllers 410a-c maintained by the CP 415 can be encapsulated in Linux containers (see Reference [4]), hosted by a group of servers that may be referred to as CPnodes, which are managed by the CP 415. (Alternatively, the controllers 410a-c may be encapsulated as virtual machines (VMs)). The CP 415 may maintain any number of CPnodes, and each CPnode may host several hundreds of generic controllers, which may operate under different laws and, thus, serve different communities. The controllers residing in each such CPnode can be managed by a local manager running on the CPnode. The CP 415, as a whole, can be managed by a global manager running on a distinguished CPnode of the CP 415. In some configurations, all managers can interact with each other, subject to suitable management-law under LGI. The encapsulation of controllers in containers has several general advantages. In particular, the architecture enables the imposition of limits on the use of various resources—such as CPU, memory, and communication—by individual controllers. Such limits can be imposed by the local manager of the CPnode and dynamically adjusted. The ability to impose such limits can make the controllers more robust because it can help to prevent an individual controller from over-consuming resources, thus preventing others from operating effectively, or at all.

Section 4.2.1.2—Direct Contributions of the CP to the Operations of the D&R Mechanism Besides the maintenance of controllers, described above, the architecture of the CP 415 facilitates the implementation of several capabilities that are essential to the operation of the D&R mechanism. The following are two such capabilities:

(1) Supplying the ledger G(L) 420, for every law L handled by Cop, with the information it needs: The detection of the failure of controllers by D&R requires that all the events that occur at every L-controller, and all the operations carried out by it, be logged correctly on the ledger G(L) 420. Unfortunately, the controllers themselves cannot be trusted to log their own events and operations because any one of them may be corrupted. So, such logging can be performed by the local manager of every CPnode, by intercepting all messages sent or received by every controller operating on it. Note that sending or receiving a message by a given controller corresponds to some event that occurred at the controller or some operation carried out by the controller. The events and operations thus logged in ledgers can be time-stamped using the local time of the CPnode on which the controller resides. Finally, it is important to point out that controllers operating subject to a given law L, thus serving actors belonging to the L-community C, may reside on different CPnodes. The managers of these CPnodes can also log events that occur on L-controllers on the G(L) ledger 420. Conversely, the manager of a given CPnode, which may host controllers operating under different laws, would have to log events on different ledgers. So, the logging of events on ledgers must be a global property of the CP 415.

(2) Recovering—by reconstruction—of a given failed L-controllers, so that it can resume its operation with a minimal loss: Such reconstruction of a controller x is carried out via the following steps: (a) replacing x with an authentic generic-controller, without changing its address; (b) loading the law L into the controller, thus making it an L-controller; and (c) loading into this controller the last correct state of the failed controller (note that the state to be loaded into the controller is computed correctly by the inspector (see Section 4.2.3), and it is not effected by the failure of the controller. The local-manager of every CPnode can be programmed to carry out such reconstruction when commanded by the inspector I(L) 425.

Section 4.2.2—The Ledger

Figure 4:
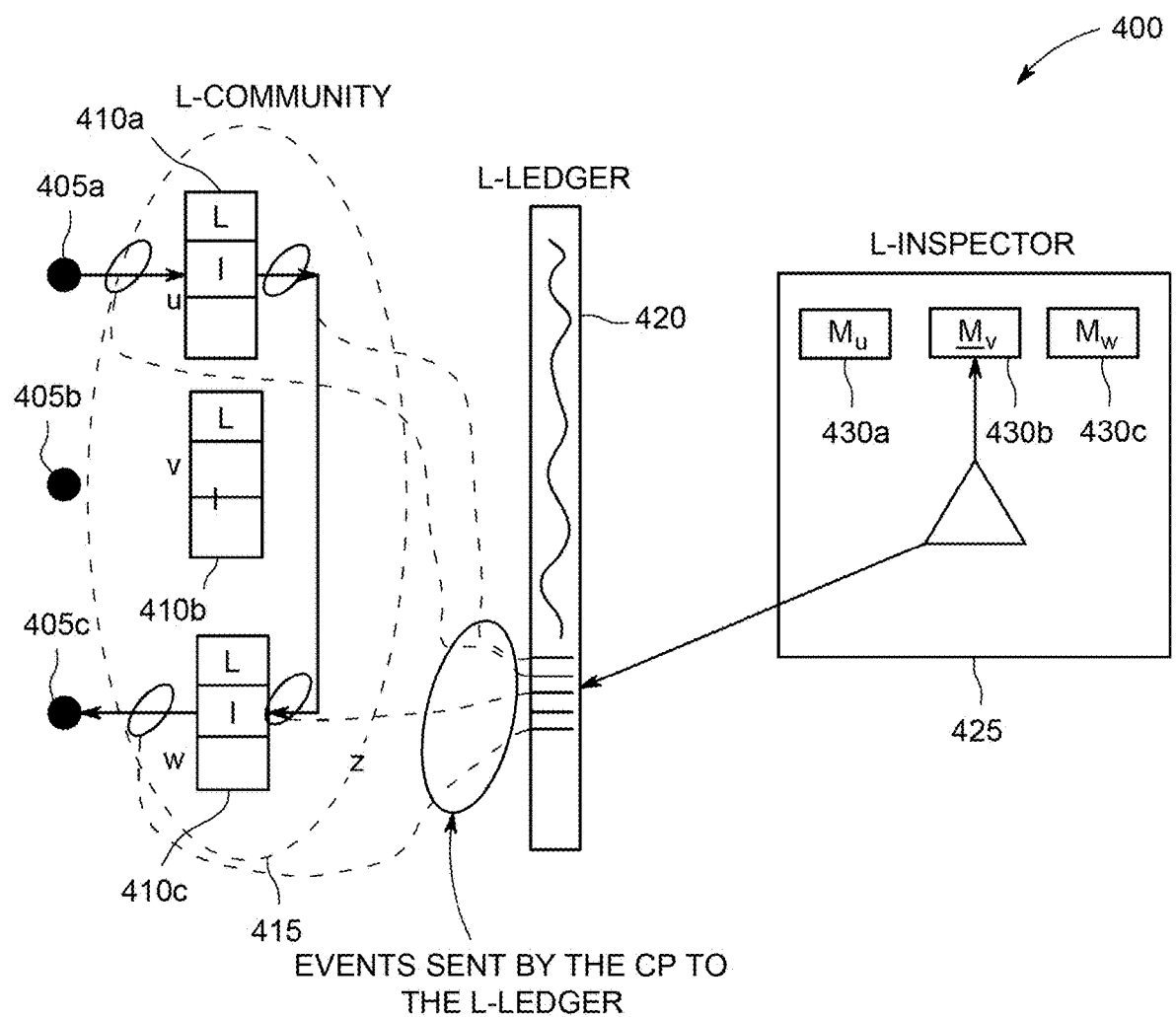
FIG. 4 is a block diagram illustrating a system for enforcing execution of a law among a plurality of parties, according to an example embodiment.

Typically, there exits one ledger G(L) 420 per an L-community, which is designed to maintain entries representing two kind of items: (a) the events that occur at every L-controller z, which represent messages obtained by z, including notices of exceptions; and (b) the operations carried out by every L-controller z, which represent messages sent by z, as required by the ruling of the law for a given event. Referring to FIG. 4, the ledger G(L) 420 is configured to be accessible by the CPnodes that contain L-controllers 410*a-c*, which feed the ledger 420 with information; and it is accessible to the to the inspector I(L) that needs to read the ledger 420 to perform its functions. The ledger 420 stores representations of events or operations handled by the L-controllers 410*a-c*. These entries can be supplied to the ledger 420 by the various CPnodes, as described above.

Such a ledger 420 can have various architectures, providing different levels of security and efficiency to Cop. It can, for example, be a form of blockchain, such as under Ethereum (see Reference [8]) or under HyperLedger (see Reference [10]). Or it can be a file, perhaps replicated, which a given organization maintains as part of its TCB. All such files can work as part of Cop. Note that a blockchain-based ledger can be used in this context, even if it is not effective for smart contracts due to smart contracts' unscalability. The reason for this is that use of a ledger under Cop is off-line, after the on-line enforcement of the protocol is performed by LGI. With smart contracts, on the other hand, a ledger is used on-line for enforcement itself.

Section 4.2.3—The Inspector

The purpose of an inspector I(L) 425 associated with a given L-community C may be twofold: (a) to inspect the dynamic behavior of all L-controllers 410*a-c* in order to detect a failure of any of them, and (b) to initiate certain corrective measures right after a failure is detected. The inspector 425 is configured to access the ledger 420 and evaluate whether representations of events or operations stored in the ledger 420 are in accordance with the law. In some configurations, the inspector 425 creates model controllers Mu 430*a*, Mv 430*b*, and Mw 430*c* corresponding to the L-controllers u 410*a*, v 410*b*, and w 410*c* to track a state of each of the L-controllers 410*a-c*.

The detection of a corrupt controller should be done as quickly as possible, because the longer a corrupt controller is allowed to operate, the more damage it can cause to its community—damage that may be hard to reverse.

Resources available to the Inspector I(L) 425 are as follows:

1. The law L of the L-community, which the inspector 425 uses to verify the correctness of the operations of L-controllers.
2. The ledger G(L) 420, which inspector I(L) 425 can scan.
3. The set of models of L-controllers; one model Mz for every L-controller z. A model Mz may be essentially a variable that has a single value that represents the correct state of a controller at any moment in time. These models 430*a-c* of controllers 410*a-c* can be constructed and maintained by the inspector 425.
4. The CP 415, which the inspector 425 uses to initiate the reconstruction of a failed controller.

Section 4.3—The Process of Inspection

Described first, in Section 4.3.1, is the process of the creation of an L-community, which is useful for the understanding the process of the inspection of such a community. Then, Section 4.3.2 describes is the inspection of a single L-controller by its inspector I(L). Finally, Section 4.3.3 describes the inspection of all the L-controllers that serve an L-community, showing that it is scalable.

Section 4.3.1—The Creation of a Community Under Cop

Assuming the pre-existence of a CP 415, an L-Community C is created by defining its law L and by creating its ledger G(L) 420 and its inspector I(L) 425. This community has no members at this point. A new member of C can be created dynamically by some actor c performing the following steps: (a) acquiring a generic controller x from the CP 415; (b) incorporating the law L into controller x, thus turning it into an L-controller; (c) adopting x as its surrogate for communication subject to law L, thus forming what is called an L-agent, which is a pair (actor c, L-controller x). Note that at the moment of its adoption, controller x has an empty state. The adoption of x creates its first event called the adopted event, which would be recorded in the ledger G(L) 420. The adopted event marks the beginning of the life of the L-controller c. It can also result in various initializing operations, depending on the ruling of law L regarding this event. Note, however, that an attempt to adopt a controller by a given actor may fail, because the law L may have constraints about which actor can join the L-community. The membership of a community can evolve dynamically and incrementally, via the kind of steps descried above.

Section 4.3.2—The Process of Inspection of a Single L-Controller x by Inspector I(L)

The inspection of x starts when x is adopted and when its first event—namely the adopted event—appears on the ledger G(L). When the inspection of x in response to the adopted event ends, the inspection continues recursively until x quits.

To describe the process of inspection it is helpful to recall the description of an LGI law provided by Formula 2 in Section 2.1, namely: a law is a function law: (e, s)→(m, ns) that maps a given (e, s) pair, into a ruling (m, ns). Here, e is an event that occurred in controller x, and s is the state of x at the time of occurrence of this event. The ruling that x is to carry out includes: (a) a (possibly empty) list m of operations that x is to perform (which are, most often, messages to be sent), and (b) a new state ns that is to replace the current state of x (note that the new state may be equal to the current state).

The following description of the inspection process has two parts: the initial inspection of controller x is described in Section 4.3.2.1; and the recursive inspection of x, after its initial inspection is done, is described in Section 4.3.2.2.

Section 4.3.2.1—The initial Inspection of x: The inspection starts when the inspector—which can continuously scan the ledger for new entries—notices the adopted event at x in the ledger, which prompts it to carry out the following example sequence of steps.

1. The inspector I(L) creates a model Mx of x, that has a single value that is used to represent the correct state of the controller just before the occurrence of any event at the controller it. The phrase "correct state" means the state that the controller x should have at this stage. Of course, there is no way of knowing what the state of the controller itself really is, but the value of Mx is what this state should be if the controller is not compromised. In the initial stage of the inspection of x, the value of Mx is an empty set, because this is the state of every newly formed controller before its adopted event is evaluated.
2. The inspector computes the ruling of law L for the adopted event at x given its current state (which, as described above, is empty), namely the pair (m, ns) that x is obliged to carry out.
3. Getting this ruling, the inspector plants ns as the new value of the model Mx. This is clearly the correct state of x at this stage, whether or not the actual controller x has it.
4. The inspector then verifies if the controller x carried out the required list of operations m. To do this, the inspector needs to compare m to the list m' of operations found on the ledger between the adopted event of x and its next event. This should be the case because the ruling of the law must be carried out atomically, and thus before the next event of x occurs. Now, there are two possibilities to consider:
    (a) If m' is equal to m, then the inspector concludes that x operates correctly. This may not seem completely justified because the inspector does not, and cannot, know if the state of the controller changed to ns as required by the ruling. But the state of x itself does not really matter. What matters is that the inspector knows that the new state of the controller must be ns, which is recorded in the model Mx of x, and can be used in computing the next ruling of the law. Moreover, as long as m' is equal to m, the effect of the controller on the rest of the system is identical to the effect mandated by the law—the internal behavior of the controller, not visible to anybody else, does not matter.
    (b) If, on the other hand m' differs from m, the inspector concludes that x has failed, and it can commence a recovery procedure from this failure. The recovery procedure is described in Section 4.4.

Section 4.3.2.2—The Recursive Inspection of x: Suppose that I(L) inspected a sequence of events $(e_1, e_2, \ldots, e_n)$ that occurred at x, without detecting any failure—where $e_1$ is the first event that occurred at x, namely the adopted event described above. The inspection continues, recursively, to the next event, if any, as follows:

1. I(L) computes the ruling of the law for the pair $(e_{n+1}, s_n)$, where $e_{n+1}$ is the new event at x found on the ledger, and $s_n$ is the current value of the model Mx which is obtained during the previous step of this recursion. Suppose now that the ruling of the law for the pair $(e_{n+1}, s_n)$ is the pair $(m_{n+1}, ns_{n+1})$, whose structure is described above.
2. Getting this ruling, the inspector plants $ns_{n+1}$ as the new value of the model $M_x$.
3. The inspector then checks if x carried out the required list of operations $m_{n+1}$. To do this it needs to compare this list to the list m' of operations found on the ledger immediately after the $e_{n+1}$ event of x, and before the next event that occurred at x, if any. Again, there are two possibilities to consider, in a direct analogy to the two possibilities of the first inspection of x:
    (a) If m' is equal to $m_{n+1}$, then conclude that x operates correctly.
    (b) If m' differs from $m_{n+1}$, then the inspector concludes that x has failed, and it commences the recovery procedure from this failure.

It is worth pointing out that the correctness of the value of Mx as the true state of the controller, that should be used for the evaluation of the law, is an invariant of this recursive inspection.

Section 4.3.3—The Inspection of all the L-Controllers Serving the L-Community, and the Scalability of this Inspection A single inspector can, in principle, inspect all the L-controllers that serve a given L-community. Such an inspector can maintain the models of all active L-controllers in a single address space and can inspect all the controllers virtually in parallel.

But there is a potential problem with this manner of inspection. Namely, when the size of the community increases, the latency between the failure of a controller and the detection of this failure grows, roughly linearly. And it can grow beyond what is acceptable by the application at hand. Fortunately, it is possible to make the process of inspection scalable with respect to the latency between the failure of a controller and its detection. This can be accomplished as follows. If the set of L-controllers in a given community is considered to be too large in the sense that it produces larger than acceptable latency, one can divide this set into any number of subgroups that can be handled by different, but identical, copies of the inspector, which can operate on different hosts, truly in parallel.

Section 4.4—Recovery from the Failures of Controllers

The following considers two kinds of complementary recoveries. The first is the resumption of the proper operation of failed controller by its reconstruction. The second deals with the issue of the possible damage caused by the failed controller to other parts of the system.

(i) The Resumption of the Proper Operation of a Failed L-Controller x: This is done by reconstructing the failed controller x. The reconstruction is prompted by the inspector that discovered the failure of x, and it is carried out by the local manager of the CPnode that hosts x. The reconstruction can be done via the following sequence of steps:

1. Controller x is replaced—without changing its address—with an authentic generic-controller provided by the CP.
2. Law L is incorporated into x.
3. The latest value of Mx is planted into x as its current state.
4. The reconstructed controller x is reactivated.

(ii) Dealing with damage that can be inflicted on a community at large by a failed controller, just before its failure is discovered: To illustrate this type of damage and the difficulty of recovering from it, consider the example Money Transfer law (MT) (above), and suppose that a faulty controller x sends to some controller y the sum of $900, which x does not have in his budget. This illegal action by x can be discovered by the inspector and the faulty controller can be replaced with a proper one. But the illegal sending of $900 has already been carried out, providing y with an illegal amount of $900. And y, in turn, can send this illegal money to some other controller z, without being faulty itself. Cop can help recover from such a problem by having the inspector notify a designated manager—which can include strategies for dealing with such issues. Such a strategy is likely to use the ledger G(L) for figuring out what happened with this illegal money.

Figure 5:
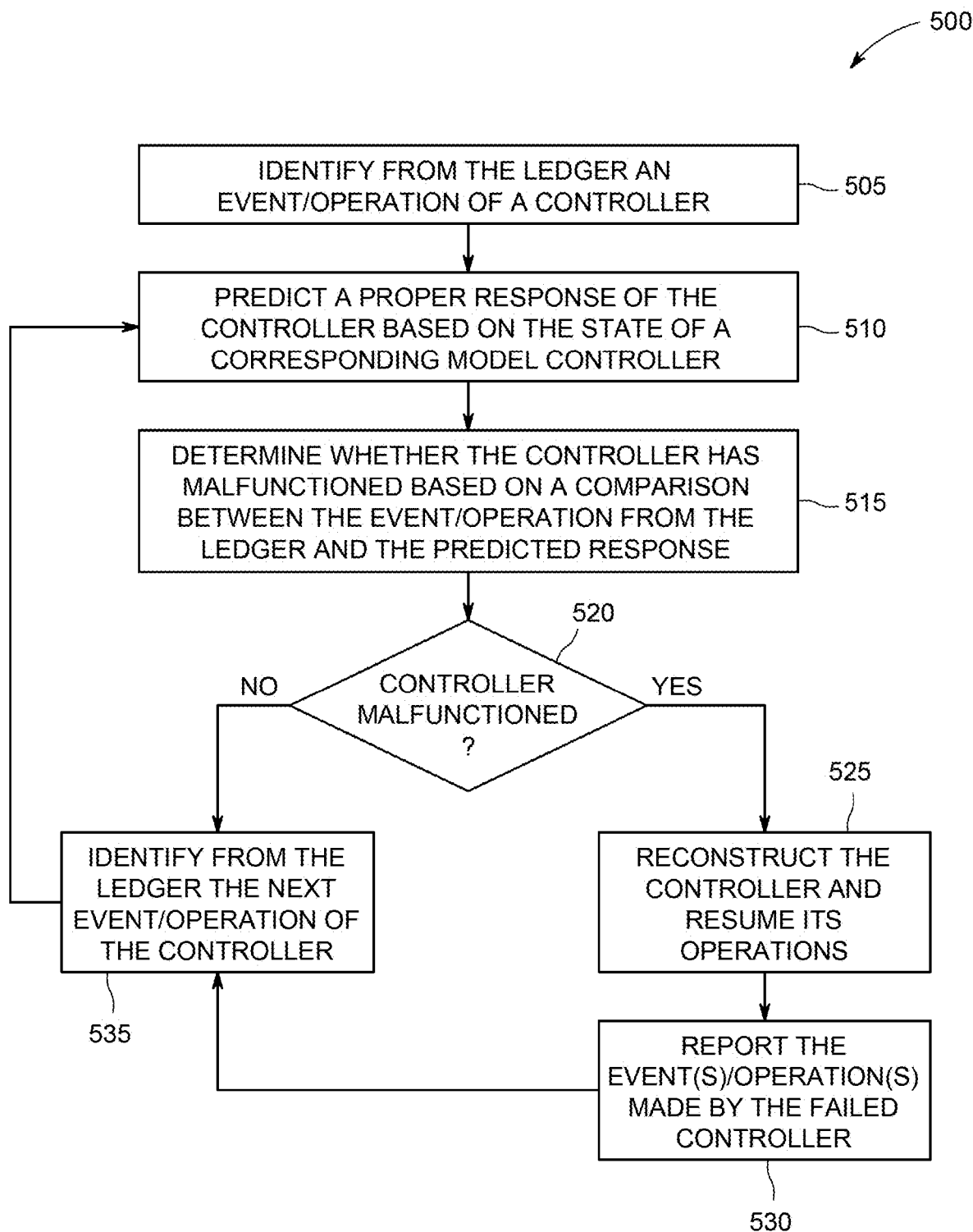
FIG. 5 is a flow diagram illustrating handling of a malfunctioning automated controller, according to an example embodiment.

FIG. 5 is a flow diagram illustrating an example method 500 of handling of a malfunctioning automated controller, according to an example embodiment. The example method 500 includes identifying 505, from the ledger, an event or operation of a controller, predicting 510 a proper response of the controller based on the state of a corresponding model controller, and determining 515 whether the automated controller has malfunctioned based on the identified and predicted response. If the controller has malfunctioned 520, the automated controller can be reconstructed and its operations resumed 525. The event(s) or operation(s) made by the failed controller are then reported 530. The next event or operation for the controller is identified 535 from the ledger and the process repeated 510.

Section 5—Additional Aspects of Cop

This section addresses three additional aspects of Cop: (1) controllable interoperability; (2) enforced obligations; and (3) the trustworthiness of the D&R mechanism.

Section 5.1—Controllable Interoperability Under Cop

As explained in Section 2.3, the LGI part of Cop—which is the part that enforces laws—provides for sophisticated kind of interoperability. Consequently, LGI can be used to govern the interaction between the components of very complex systems, such as federated enterprise, which comprises of a collection of communities operating under different laws that interoperate with each other. Moreover, it is possible to organize such interoperating laws in a hierarchy, which provides a way to control which communities can interoperate with each other, and how. Reference [6] demonstrates how this can be done under LGI.

But can the D&R mechanism—the part of Cop that detects failures of controllers and recovers from such failures—be applied to communities that interoperate with each other? The answer is that interoperation presents no difficulty to D&R. This is because a controller x that serves some L-community, operates subject to law L even if this community interoperates with another community that is subject to another law L'. So, the inspection of x is the same as the inspection of a controller that belongs to an isolated community. In other words, the Cop mechanism described in Section 4 can be applied to complex systems that comprise of multiple interoperating communities.

Section 5.2—LGI's Concept of Enforced Obligation, and its Treatment Under Cop The concept of enforced obligation (or "obligation" for short) provides LGI with important proactive capabilities, invaluable for security and for fault tolerance. This concept can be used, for example, to ensure that resources will not stay locked indefinitely, or, as an analogy, to penalize book borrowers that do not return a book in the appointed time. In other words, this concept enables LGI to establish a class of liveness properties.

Informally speaking, an obligation incurred by a given controller serves as a kind of motive force, which ensures that a certain action (called sanction) is carried out by this controller at a specified time in the future (the deadline), when the obligation is said to come due—provided that certain conditions on the state of the controller are satisfied at that time. This mechanism operates under LGI as follows.

A controller x incurs an obligation by the execution, as part of the ruling of some event, of an operation imposeObligation(oType,dt), where oName is the name of the obligation and dt is the time period after which the obligation is to come due. When this obligation comes due, after dt seconds, the event obligationDue(oName) occurs at controller x. The occurrence of this event causes the controller to evaluate the ruling of the law for this event, and to carry out its ruling. The ruling of the law for an obligationDue(oType) event is, thus, the sanction for obligation oName.

But this mechanism of LGI relies on the controller itself to determine when the obligationDue(oType) event occurs. But the D&R mechanism does not, and cannot, rely on the controllers themselves to support this capability, because a controller may be corrupted. Instead, the concept of obligation can be implemented in Cop by making two changes to the obligation mechanism of LGI, without changing its semantics. First, the operation imposeObligation(oType,dt) can cause a message to be sent to, what may be called, an obligation-server implemented in the CPnode where controller x resides. When the deadline for this obligation arrives, the obligation-server would send the message obligationDue(oName) to x. Second, the obligationDue(oName) message sent by the obligation-server is viewed by the receiving controller as an event that would be handled just as the internal event obligationDue(oName) is handled by LGI. That is, the controller evaluates the ruling of the law for the event, and then carries out its ruling—thus preserving the original semantics of the enforced obligation under LGI.

Section 5.3—Trustworthiness of the (D&R) Mechanism

The D&R mechanism is designed for protecting against the possible failure of controllers, but this protection can be effective only if the D&R mechanism itself—including the CP, the ledger(s), and the inspector(s)—operates correctly. These components of D&R must then be viewed and handled as the trusted computing base (TCB) of Cop. Of course, components of a TCB may fail and they may be attacked, and an effort must be made to verify and protect them. Various traditional means, including TPM and related technologies, are available for this purpose. For example, instead of using a single inspector to inspect a set of controllers, one may use the byzantine fault-tolerant consensus (PBFT) protocol, with, say, three inspectors.

Section 6—Computer Network Operating Environment

Figure 6:
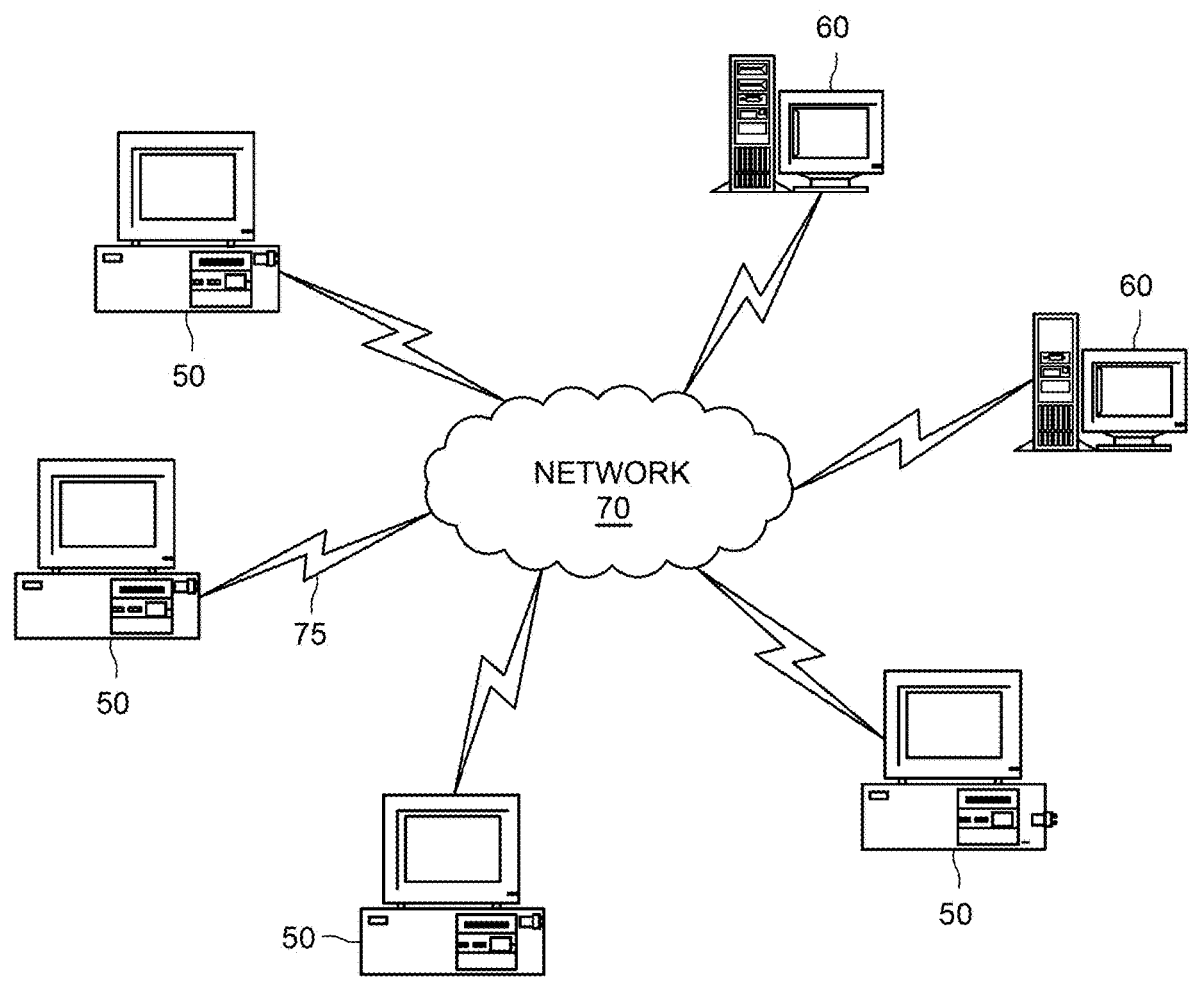
FIG. 6 is a schematic view of a computer network environment in the example embodiments presented herein can be implemented.

FIG. 6 illustrates a computer network or similar digital processing environment in which the present embodiments may be implemented. Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), cloud computing servers or service, a worldwide collection of computers, Local area or Wide area networks, and gateways that currently use respective protocols (TCP/IP, Bluetooth, etc.) to communicate with one another. Other electronic device/computer network architectures are suitable.

Figure 7:
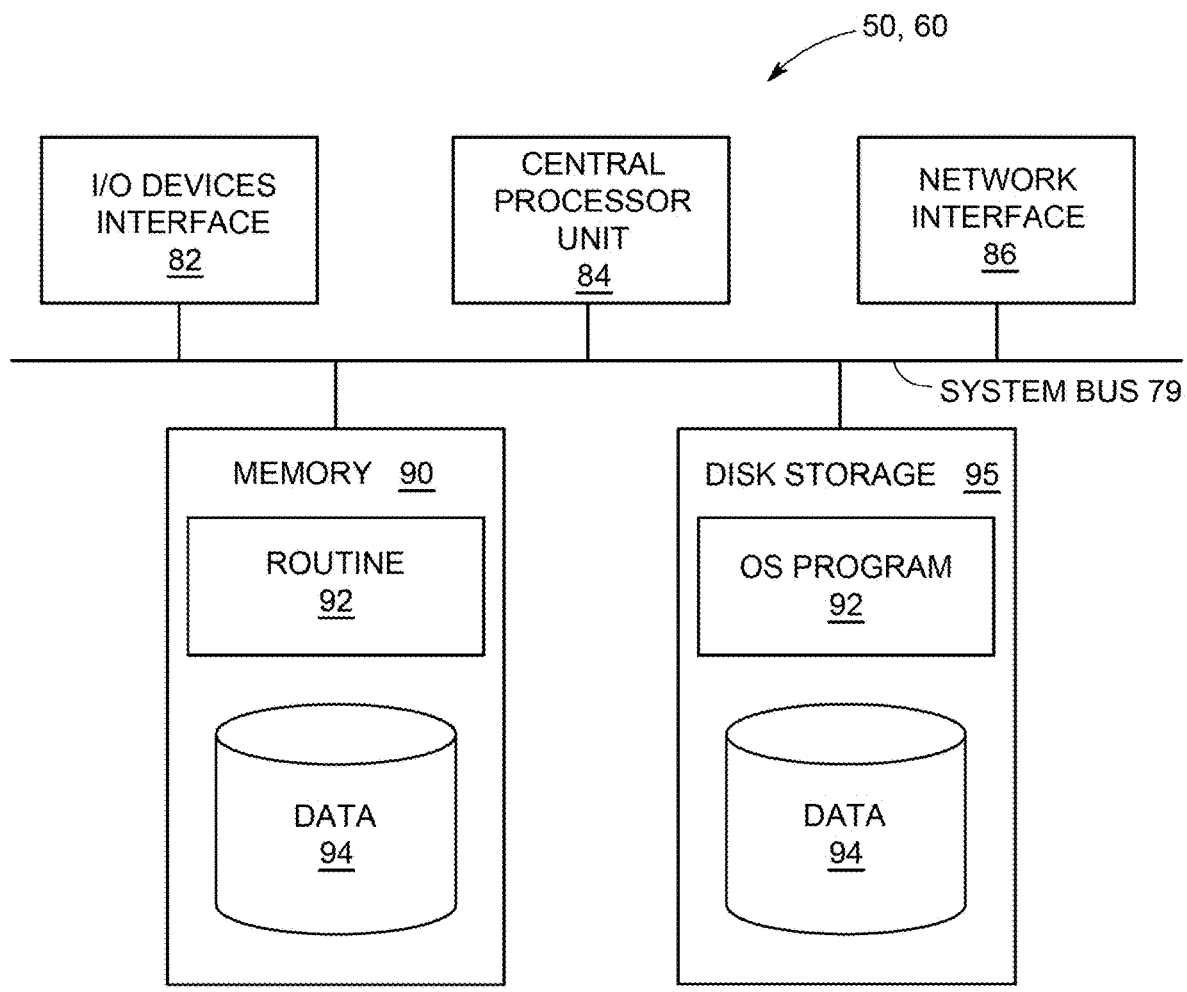
FIG. 7 is a block diagram illustrating an example computer node of the network of FIG. 6.

FIG. 7 is a diagram of the internal structure of a computer (e.g., client processor/device 50 or server computers 60) in the computer system of FIG. 6. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, and network ports) that enables the transfer of information between the elements. Attached to system bus 79 is I/O device interface 82 for connecting various input and output devices (e.g., keyboard, mouse, displays, printers, and speakers) to the computer 50, 60. Network interface 86 allows the computer to connect to various other devices attached to a network (e.g., network 70 of FIG. 6). Memory 90 provides volatile storage for computer software instructions 92 and data 94 used to implement many embodiments (e.g., code detailed above and in FIGS. 3 and 5 including routines 300 and 500). Disk storage 95 provides non-volatile storage for computer software instructions 92 and data 94 used to implement many embodiments. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, and tapes) that provides at least a portion of the software instructions for the system. Computer program product 92 can be installed by any suitable software installation procedure, as is well known in the art. In another embodiment, at least a portion of the software instructions may also be downloaded over a cable, communication and/or wireless connection. In other embodiments, the programs are a computer program propagated signal product 75 (FIG. 6) embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product. Generally speaking, the term "carrier medium" or transient carrier encompasses the foregoing transient signals, propagated signals, propagated medium, storage medium and the like. In other embodiments, the program product 92 may be implemented as a so-called Software as a Service (SaaS), or other installation or communication supporting end-users.

REFERENCES

[1] Xuhui Ao and Naftaly H Minsky. Flexible regulation of distributed coalitions. In *Computer Security—ESORICS* 2003, pages 39-60. Springer, unknown, 2003.

[2] Miguel Castro and Barbara Liskov. Proactive recovery in a byzantine-fault-tolerant system. In *osdi00*, October 2000.

[3] M. Ionescu, Naftaly H. Minsky, and T. Nguyen. Enforcement of communal policies for peer-to-peer systems. In *Proc. of the Sixth International Conference on Coordination Models and Languages, Pisa Italy*, February 2004.

[4] Dirk Merkel. Docker: lightweight linux containers for consistent development and deployment. *Linux Journal*, 2014(239):2, 2014.

[5] Naftaly H. Minsky. *Law Governed Interaction (LGI): A Distributed Coordination and Control Mechanism (An Introduction, and a Reference Manual)*. Rutgers, February 2006. (available at http://www.moses.rutgers.edu/).

[6] Naftaly H Minsky. On the dependability of highly heterogeneous and open distributed systems. *Journal of Software Engineering and Applications*, 11(01):28, 2018.

[7] Naftaly H. Minsky and V. Ungureanu. Law-governed interaction: a coordination and control mechanism for heterogeneous distributed systems. *TOSEM, ACM Transactions on Software Engineering and Methodology*, 9(3):273-305, July 2000.

[8] Gareth W Peters and Efstathios Panayi. Understanding modern banking ledgers through blockchain technologies: Future of transaction processing and smart contracts on the internet of money. In *Banking Beyond Banks and Money*, pages 239-278. Springer, 2016.

[9] Nick Szabo. Formalizing and securing relationships on public networks. *First Monday*, 2(9), 1997. p

[10] Marko Vukoli´c. Rethinking permissioned blockchains. In *Proceedings of the ACM Workshop on Blockchain, Cryptocurrencies and Contracts*, pages 3-7. ACM, 2017.

[11] Blakstad S., Allen R. FinTech Revolution: *Universal Inclusion in the New Financial Ecosystem*. Springer, Jun. 27, 2018.

While example embodiments have been particularly shown and described, it will be understood by those skilled in the art that various changes in form and details may be made therein without departing from the scope of the embodiments encompassed by the appended claims.

What is claimed is:

1. A system for enforcing execution of a protocol among a plurality of parties, the system comprising:
    a processor; and
    a memory with computer code instructions stored thereon, the memory operatively coupled to said processor such that the computer code instructions configure the processor to implement:
        a controller provider configured to manage a plurality of automated controllers corresponding to the plurality of parties, each automated controller configured to enforce execution of the protocol using a computer program integrated with the automated controller;
        a ledger configured to be accessible by the controller provider and to store representations of events or operations handled by the automated controllers; and
        an inspector configured to access the ledger and evaluate whether representations of events or operations stored in the ledger are in accordance with the protocol.

2. A system as in claim 1 wherein the controller provider is configured to provide to the ledger time-ordered representations of events or operations handled by the automated controllers.

3. A system as in claim 1 wherein the ledger is implemented as a blockchain.

4. A system as in claim 1 wherein the inspector is configured to create model controllers corresponding to the automated controllers to track a state of each of the automated controllers.

5. A system as in claim 4 wherein a model controller includes a data structure that represents a current state of a corresponding automated controller.

6. A system as in claim 4 wherein the inspector is configured to use the state of a given model controller to predict a proper response of a corresponding automated controller to a next event to occur at the corresponding automated controller.

7. A system as in claim 6 wherein the inspector is configured to determine that the automated controller corresponding to the given model controller has malfunctioned if an entry added to the ledger by the corresponding automated controller does not match the response predicted by the inspector.

8. A system as in claim 7 wherein the inspector is configured to cause the malfunctioned automated controller to be reconstructed and its operation resumed with a last state before its malfunction.

9. A system as in claim 7 wherein the inspector is configured to report the malfunctioned automated controller and at least one operation it carried out before its reconstruction.

10. A system as in claim 1 wherein the computer code instructions further configure the processor to implement a plurality of inspectors, each inspector configured to evaluate representations of events or operations associated with a subset of the automated controllers.

11. A system as in claim 1 wherein the controller provider manages a plurality of automated controllers corresponding to a plurality of parties of different communities, each community of automated controllers operating subject to a different protocol.

12. A method of enforcing execution of a protocol among a plurality of parties, the method comprising:
    accessing, via a controller provider, a plurality of automated controllers corresponding to the plurality of parties;
    integrating the protocol with the automated controllers as a computer program executable by the automated controllers to enforce execution of the protocol;
    storing, in a ledger, representations of events or operations handled by the automated controllers; and
    inspecting a given representation of a given event or operation handled by a given automated controller to determine whether the given event or operation stored in the ledger is in accordance with the protocol.

13. A method as in claim 12 wherein the controller provider provides to the ledger time-ordered representations of events or operations handled by the automated controllers.

14. A method as in claim 12 wherein storing the representations in the ledger includes storing the representations in a blockchain.

15. A method as in claim 12 further comprising creating model controllers corresponding to the automated controllers to track a state of each of the automated controllers.

16. A method as in claim 15 further comprising predicting, based on a state of a given model controller, a proper response of a corresponding automated controller to a next event to occur at the corresponding automated controller.

17. A method as in claim 16 further comprising determining that the corresponding automated controller has malfunctioned if an entry added to the ledger by the corresponding automated controller does not match the predicted response.

18. A method as in claim 17 further comprising reconstructing the malfunctioned automated controller and resuming its proper operation.

19. A method as in claim 17 further comprising reporting the malfunctioned automated controller and at least one operation it carried out before it was reconstructed.

20. A method as in claim 12 wherein the controller provider manages a plurality of automated controllers corresponding to a plurality of parties of different communities, each community of automated controllers operating subject to a different protocol.

* * * * *